US008681745B2

(12) United States Patent
Müller

(10) Patent No.: US 8,681,745 B2
(45) Date of Patent: Mar. 25, 2014

(54) METHOD AND ARRANGEMENT IN A TELECOMMUNICATION SYSTEM

(75) Inventor: Walter Müller, Upplands Väsby (SE)

(73) Assignee: Unwired Planet, LLC, Reno, NV (US)

( * ) Notice: Subject to any disclaimer, the term of this patent is extended or adjusted under 35 U.S.C. 154(b) by 304 days.

(21) Appl. No.: 12/739,322

(22) PCT Filed: Oct. 25, 2007

(86) PCT No.: PCT/SE2007/050777
§ 371 (c)(1),
(2), (4) Date: Apr. 22, 2010

(87) PCT Pub. No.: WO2009/054761
PCT Pub. Date: Apr. 30, 2009

(65) Prior Publication Data
US 2010/0246519 A1 Sep. 30, 2010

(51) Int. Cl.
*H04W 4/00* (2009.01)
*H04W 36/00* (2009.01)

(52) U.S. Cl.
USPC ........... 370/332; 370/252; 370/331; 455/444; 455/452.1

(58) Field of Classification Search
USPC .............. 370/252, 255, 310.2, 328, 329, 330, 370/331, 332; 455/422.1, 432.1, 436–444, 455/447, 449, 452.1, 115.3, 181.1
See application file for complete search history.

(56) References Cited

U.S. PATENT DOCUMENTS

| 5,260,944 A | 11/1993 | Tomabechi |
| 5,507,034 A | 4/1996 | Bodin et al. |
| 5,613,198 A | 3/1997 | Ahmadi et al. |
| 5,862,124 A * | 1/1999 | Hottinen et al. ............... 370/335 |
| 7,149,476 B2 * | 12/2006 | Shah ........................... 455/67.11 |
| 2002/0102985 A1 * | 8/2002 | Amalfitano et al. .......... 455/453 |
| 2004/0192360 A1 | 9/2004 | Tsai et al. |
| 2006/0246905 A1 * | 11/2006 | Sakuma et al. ............... 455/438 |
| 2007/0177501 A1 | 8/2007 | Papasakellariou |
| 2008/0008149 A1 * | 1/2008 | Yang ............................ 370/338 |
| 2010/0246519 A1 * | 9/2010 | Muller ......................... 370/329 |

FOREIGN PATENT DOCUMENTS

| EP | 1 122 895 A1 | 8/2001 |
| WO | WO 2006/116909 A1 | 11/2006 |
| WO | WO 2007/080505 A1 | 7/2007 |

OTHER PUBLICATIONS

Supplementary European Search Report dated Jun. 6, 2013 in Application No. EP 07835361.2.
International Search Report mailed Sep. 2, 2008 in International Application No. PCT/SE2007/050777.

(Continued)

*Primary Examiner* — Benjamin H Elliott, IV
(74) *Attorney, Agent, or Firm* — Nixon & Vanderhye P.C.

(57) ABSTRACT

A method of controlling an unsynchronized cellular wireless telecommunication system includes, for at least one user equipment served by a first cell, receiving signal strength measurements and, based on the signal strength measurements, determining whether the user equipment should be scheduled for a low interference time period during which neighboring cells are configured to minimize interference in the first cell. The method additionally includes receiving neighboring cell time difference measurements from at least one mobile device within the first cell and, based on said measurements, determining a timing of transmissions from at least one neighboring cell relative to a timing of transmissions from the first cell. Additionally, the method includes defining the low interference time period based on the determined timing of transmissions from the at least one neighboring cell.

9 Claims, 5 Drawing Sheets

(56) References Cited

OTHER PUBLICATIONS

Tempesta et al., Impact of Interference on GPRS/EGPRS Services and Performance Optimization in a Multi-Cell Scenario, 8$^{th}$ Semester, May 2007, 82 pages.

Fodor et al., Modeling and Performance Analysis of Scheduling Policies for OFDMA Based Evolved UTRA, 13 pages, 2007.

Bonald et al., Inter-Cell Scheduling in Wireless Data Networks, CWI Report, 2004, 7 pages.

Chunwei He et al., "CO-Channel Interference Mitigation in MIMO-OFDM System", IEEE Int. Conf. on Wireless Communications, Networking and Mobile Computing 2007, WiCom2007 Aug. 21, 2007, pp. 204-208, Chapters II, III.

3GPP TSG RAN WG1 R1-051059, Oct. 10-14, 2005, "Intercell Interference Mitigation for EUTRA", pp. 1-7, Chapter 3.

Seok Ho Won et al., Inter-Cell Interference Coordination/Avoidance for Frequency Reuse by Resource Scheduling in an OFDM-Based Cellular System, IEEE Vehicular Technology Conference, Oct. 2007, VTC-2007, pp. 1722-1725, Chapter II.

Amir Ghasemi et al., Distributed Intercell Coordination Through Time Reuse Partitioning in Down CDMA, 2004 IEEE Wireless Communications and Networking Conference, WCNC 2004, Mar. 21-25, 2004, pp. 1992-1997, Chapter 4.

* cited by examiner

METHOD AND ARRANGEMENT IN A TELECOMMUNICATION SYSTEM

TECHNICAL FIELD

The present invention relates to wireless telecommunication systems, and in particular to resource allocation in wireless telecommunication systems.

BACKGROUND

Many wireless telecommunication systems are cellular. That is, the coverage area is divided into cells, and each mobile device, or other user equipment, communicates with a base station in the cell in which it is located. In order to achieve such communication, a communication resource must be allocated to the mobile device. The available communication resources include the available communication bandwidth and the available time. Thus, in a TDMA (Time Division Multiple Access) system, the available communications channel is allocated to different users at different times, while, in a FDMA (Frequency Division Multiple Access) system, different communications frequencies are allocated to different users.

Many cellular wireless telecommunication systems use a combination of TDMA and FDMA, in that the communication resource allocated to a user comprises a particular bandwidth allocation during a specified time period.

One issue in cellular wireless telecommunication systems concerns interference. That is, where for example a mobile device is located between a base station to which it is transmitting and another base station that is also receiving signals transmitted on the same frequency, there is a danger that the signals transmitted from that mobile device will erroneously be received, and/or will cause interference at the other base station.

One way to solve this issue is to allocate the available transmission frequencies to different cells, in such a way as to reduce the probability of such interference. For example, if a transmission frequency is allocated for use by mobile devices within a particular cell of the system, then it may advantageously not be allocated for use by mobile devices within any other cell that neighbours that particular cell. This step reduces the probability that the signals transmitted from that mobile device will erroneously be received, or will cause interference at any other base station that is receiving signals on that transmission frequency.

SUMMARY

In aspects of the present invention, transmission times in different cells are controlled in such a way as to reduce the probability of interference with transmissions in neighbouring cells.

More specifically, in one embodiment, the invention provides a method of controlling a cellular wireless telecommunication system, in which data is transmitted in frames, and wherein, for a first cell of said system, there is semi-statically defined at the same time position in a plurality of consecutive time intervals a low interference time period for transmissions in the first cell, each of said time intervals comprising an equal number of frames, and the low interference time period being a time period during which neighbouring cells are configured to minimize interference in the first cell;
the method comprising, for at least one user equipment served by the first cell:
receiving signal strength measurements; and
based on the signal strength measurements, determining whether the user equipment should be scheduled for the low interference time period This has the advantage that the probability of interference may be reduced, and hence that the overall capacity of the cell can be used with high efficiency.

DETAILED DESCRIPTION

Figure 1:
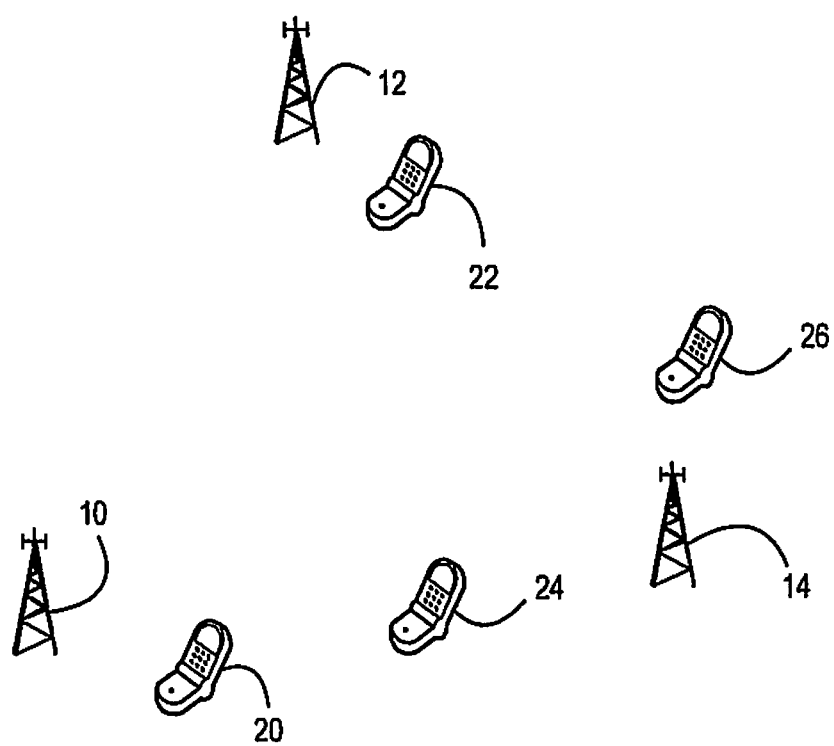
FIG. 1 illustrates a wireless communication network according to an aspect of the present invention.
Figure 2:
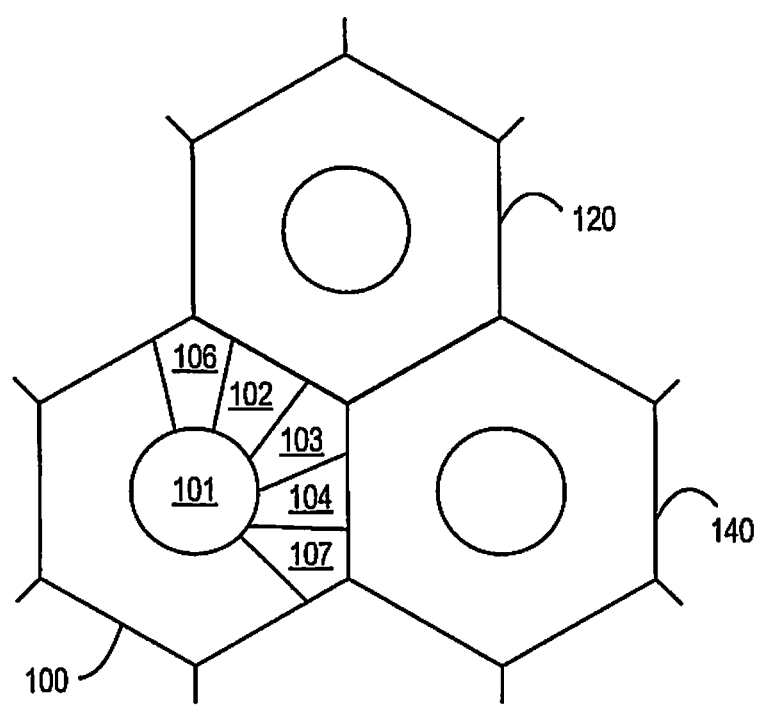
FIG. 2 illustrates a division of a network coverage area into cells in the network of the present invention.

FIG. 1 shows a wireless communication network, in which there are a number of base stations 10, 12, 14, located within a coverage area of the network such that they can provide mobile communication services to user equipments active within the coverage area. FIG. 2 shows four such user equipments, in the form of mobile phones 20, 22, 24, 26, but it will be appreciated that any suitable type of user equipment can be used in the network.

As is conventional, the base stations 10, 12, 14 have connections to a core network (not shown) of the wireless communication network, and each have radio transceiver circuitry for communicating with the user equipments. The coverage area of the network is divided into cells, as described in more detail below, with each base station providing service to the user equipments located within the corresponding cell.

The user equipments are similarly conventional, and also have radio transceiver circuitry, for communicating with the base stations.

The invention is described herein with reference to a wireless communication network operating on the OFDMA (Orthogonal Frequency Division Multiple Access) principle, in which the whole of the available frequency bandwidth is used in each of the cells. This available bandwidth is divided into sub-channels, and one or more of these sub-channels can be allocated for communications with any particular user equipment.

Although FIG. 1 shows only a small number of base stations and user equipments, it will be appreciated that a practical network is likely to include large numbers of base stations and user equipments.

FIG. 2 illustrates schematically the division of the coverage area into cells. More specifically, FIG. 2 shows a part of the network coverage area being divided into three cells 100, 120, 140, served respectively by the base stations 10, 12, 14. The base stations are not shown in FIG. 2 although it will be recognized that one common arrangement involves the definition of each cell in the area surrounding the respective base station. It will also be recognized that the division shown in FIG. 2 is purely illustrative, and that the shape of cells is not regular as shown in FIG. 2, but rather is defined by the radio frequency properties of the environment, and the signal strengths employed by the base stations, as well as by the positions of other surrounding base stations.

Each user equipment can be instructed by its serving base station to make measurements relating to the signals transmitted by that serving base station and by other base stations. One of the purposes of such measurements is to allow the network to determine the nearby cells that should be considered to be neighbouring cells, it being recognized that the arrangement of base stations and cells will likely be less regular in practice than that shown in FIG. 2.

As is conventional, the cells 100, 120, 140 define the areas served respectively by the base stations 10, 12, 14. That is, a mobile device within the cell 100 will have a connection to the base station 10, etc. In preferred embodiments of the present invention, the cells are subdivided, and the service provided to a user equipment depends on the part of the cell in which it is located.

Figure 3:
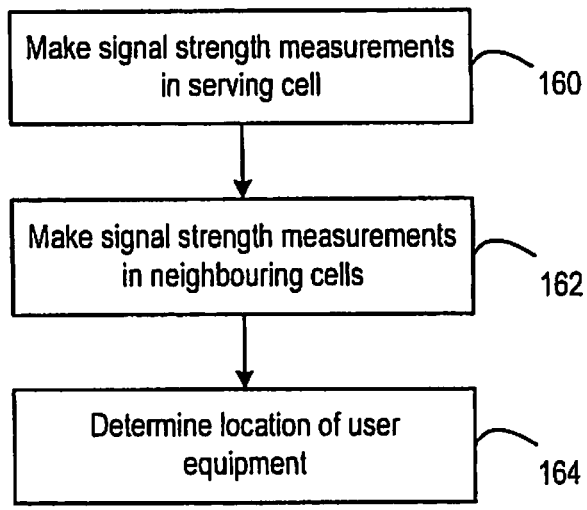
FIG. 3 is a flow chart, illustrating a method according to an aspect of the present invention.

FIG. 3 is a flow chart, illustrating a method for determining a part of the serving cell in which a user equipment is located.

In step 160, the user equipment measures the strength of signals received from its serving cell. Techniques for measuring signal strength are well known to the person skilled in the art, and will not be described further. The invention will be described by way of an illustrative example, with reference to a user equipment that is located within the cell 100, and so in step 160 the user equipment measures the strength of signals received from the cell 100.

In step 162, the user equipment measures the strength of signals received from the neighbouring cells. Again, techniques for determining the neighbour cell list, and for making the signal strength measurements, are well known to the person skilled in the art, and will not be described further. In the case of the user equipment that is located within the cell 100, in step 160 the user equipment measures the strength of signals received from the cells 120 and 140, as well as other neighbouring cells not shown in detail in FIG. 2.

In step 164, a comparison is made, for example within the base station 10 or elsewhere in the network, between the signal strength measurements made in steps 160 and 162. Based on these comparison results, the cell 100 is logically subdivided into regions, and the location of the user equipment within one of those regions is determined.

FIG. 2 shows a part of the logical subdivision of the cell 100, based on the comparison of the signal strength measurements.

Where the signal strength measured in step 160, i.e. the signal strength from the serving cell 100, is greater than any of the signal strengths measured in step 162, i.e. the signal strengths from the neighbouring cells, by a margin that exceeds some threshold value, such as 3 dB, then the user equipment is determined to be in an interior region 101 of the cell 100, and the user equipment (UE) is referred to as an interior UE.

By contrast, where the signal strength from the serving cell 100 does not exceed all of the signal strengths from the neighbouring cells by a margin that exceeds the threshold value, such as 3 dB, then the user equipment is determined to be in an exterior region of the cell 100, and the user equipment is referred to as an exterior UE.

More specifically, where the signal strength from the serving cell 100 does not exceed the signal strength from the neighbouring cell 120 by a margin that exceeds the threshold value, but where the signal strength from the serving cell 100 does exceed the signal strength from all of the other neighbouring cells by a margin that exceeds the threshold value, then the exterior UE is determined to be in the exterior region 102 that borders the neighbouring cell 120.

Similarly, where the signal strength from the serving cell 100 does not exceed the signal strength from the neighbouring cell 140 by a margin that exceeds the threshold value, but where the signal strength from the serving cell 100 does exceed the signal strength from all of the other neighbouring cells by a margin that exceeds the threshold value, then the exterior UE is determined to be in the exterior region 104 that borders the neighbouring cell 140.

Where the signal strength from the serving cell 100 does not exceed the signal strength from the neighbouring cell 120 by a margin that exceeds the threshold value, and also does not exceed the signal strength from the neighbouring cell 140 by a margin that exceeds the threshold value, but where the signal strength from the serving cell 100 does exceed the signal strength from all of the other neighbouring cells by a margin that exceeds the threshold value, then the exterior UE is determined to be in the exterior region 103 that borders both of the neighbouring cells 120, 140.

Similar exterior regions 106, 107 are defined, with the exterior region 106 bordering the neighbouring cell 120 and one other neighbouring cell not shown in detail in FIG. 2, and the exterior region 107 bordering the neighbouring cell 140 and a different neighbouring cell not shown in detail in FIG. 2. Other exterior regions are also defined, bordering other neighbouring cells, but are not shown in FIG. 2.

Thus, any user equipment in the interior region 101 can be regarded as an interior device, while other user equipments can be regarded as exterior devices. Then, exterior devices in the regions 106, 102 and 103 that border the first neighbouring cell 120 can be regarded as having a higher risk of interference with that first neighbouring cell, while exterior devices in the regions 103, 104 and 107 that border the second neighbouring cell 140 can be regarded as having a higher risk of interference with that second neighbouring cell, it being noted of course that exterior devices in the region 103 that borders the first and second neighbouring cells 120, 140 can be regarded as having a higher risk of interference both with the first and with the second neighbouring cell.

Figure 4:
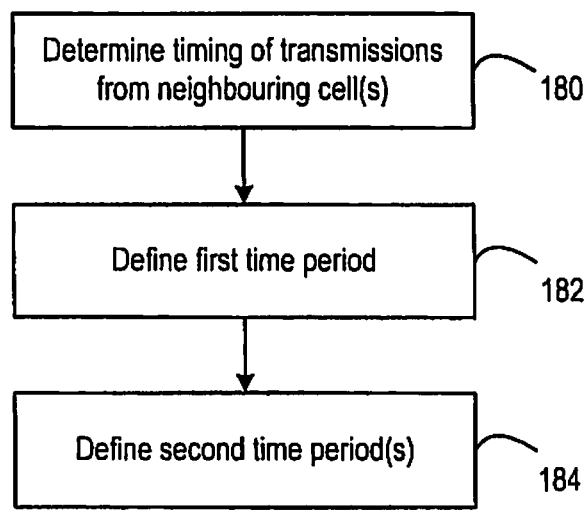
FIG. 4 is a flow chart, illustrating a second method according to an aspect of the present invention.

FIG. 4 is a further flow chart, illustrating a further method in accordance with the present invention, whereby a degree of coordination is achieved between the cells.

In step 180, the timing of the transmissions from one or more neighbouring cells is determined, relative to the timing of the transmissions from the cell under consideration. This determination may be made in the base station serving that cell, or may be made elsewhere in the network and communicated explicitly or implicitly to the cell, as required.

The methods described herein can be applied either to synchronized networks or to unsynchronized networks. In the case of synchronized networks, each of the base stations starts the transmission of a new frame of data simultaneously. Therefore, in this case, it can readily be determined that there is no time difference between the transmissions from each base station.

In the case of an unsynchronized network, the frames transmitted by the different base stations begin at times that are effectively random. Therefore, in this case, each base station instructs the devices within its cell to make measurements relating to the timing of the transmissions from the neighbouring cells, relative to the timing of its own transmissions. For example, the relative timings can be determined with reference to the system frame numbers of the respective transmissions.

These measurements can be made at regular periodic intervals, or when initiated by the network or the base station in response to a specified condition occurring.

In step 182, there is defined for the cell a first time period, which is advantageously a time period during which there is a lower probability of interference from neighbouring cells. This will be discussed in more detail below.

In step 184, there is defined for that cell one or more second time periods, which correspond to the first time periods defined in neighbouring cells, and during which there may be a higher probability of interference from neighbouring cells. Again, this will be discussed in more detail below.

Figure 5:
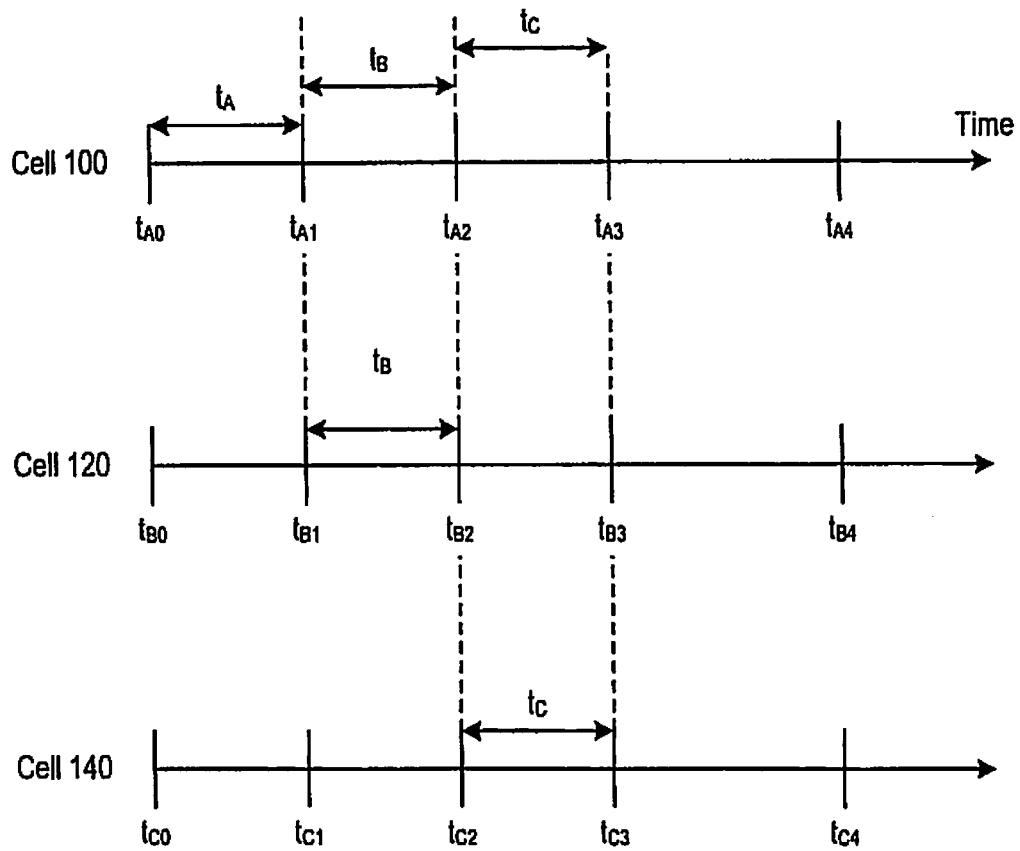
FIG. 5 is a timing diagram, illustrating operation of a first network in accordance with the method of FIG. 4.

The operation of the method is illustrated, firstly with reference to its application in a synchronized network, in FIG. 5. As is well known, communications networks that use time division duplexing (TDD) are usually synchronized, to allow for the possibility that a device will handover from one cell to another and retain the same timings. Similarly, systems that use frequency division duplexing (FDD) need to be synchronized if they are to allow the transmission of multicast messages. Thus, the system illustrated in FIG. 5 may arise in such networks but will not arise exclusively in such networks.

In FIG. 5, there are shown the timings of transmissions from the three cells 100, 120, 140 described above. As mentioned previously, the transmissions from the three cells are divided into frames, as specified by the relevant OFDMA communication system. The available communication resources are then the available sub-channels into which the bandwidth is divided, and the available fractions of each frame. In one embodiment of the invention, each active user equipment may be allocated all of the available sub-channels for some fraction of each frame. In other embodiments, an active user equipment may be allocated only a fraction of the available sub-channels for some fraction of each frame.

Aspects of the present invention relate primarily to the way in which the fraction of the frame is allocated to a particular user equipment.

In this embodiment of the invention, each frame is divided into three sections, each of equal length. Thus, a first frame transmitted from the cell 100 is divided into sections $t_{A0}$-$t_{A1}$, $t_{A1}$-$t_{A2}$, $t_{A2}$-$t_{A3}$, while a second frame is divided into sections $t_{A3}$-$t_{A4}$, etc. Similarly, a first frame transmitted from the cell 120 is divided into sections $t_{B0}$-$t_{B1}$, $t_{B1}$-$t_{B2}$, $t_{B2}$-$t_{B3}$, while a second frame is divided into sections $t_{B3}$-$t_{B4}$, etc, and a first frame transmitted from the cell 140 is divided into sections $t_{C0}$-$t_{C1}$, $t_{C1}$-$t_{C2}$, $t_{C2}$-$t_{C3}$, while a second frame is divided into sections $t_{C3}$-$t_{C4}$, etc.

Within each of the cells 100, 120, 140, a time period is defined, during which there is a lower probability of interference from neighbouring cells. In one embodiment of the invention, these time periods may be determined by network planning and the relevant base station may be informed which time period to adopt. In another embodiment, the time period may be determined by the base station on the basis of measurements made by user equipments within the cell. The time differences between the serving cell and the neighbouring cells may be determined by knowledge of the network planning in the case of synchronized cells, or may be determined by the base station on the basis of measurements made by user equipments within the cell or by the base station itself.

In either case, the time period is defined at least semi-statically, i.e. on a static or semi-static basis. That is, after the time period has been defined for a cell, it occurs at the same time position for a significant period of time, and in particular for the duration of a large number of frames, for example until measurements suggest that the radio environment has changed, or the timing relations between cells have changed. Again, the radio environment or the timing relations can be monitored using UE measurements or measurements made by the base station itself.

For example, as shown in FIG. 5, and referring to FIG. 2, the cell 100 may adopt the time period $t_A$ from $t_{A0}$-$t_{A1}$ as its less interfered time period, the cell 120 may adopt the time period $t_B$ from $t_{B1}$-$t_{B2}$ as its less interfered time period, and the cell 140 may adopt the time period $t_C$ from $t_{C2}$-$t_{C3}$ as its less interfered time period. In this embodiment, there are only three time periods that are available for selection by each of the cells in the system. Preferably, these time periods are selected by the different cells such that no time period is adopted as the less interfered time period by any two adjacent cells. Even if this is not possible then, in any event, steps are preferably taken to ensure the maximum average reuse distance between cells that share a time period as the less interfered time period.

Although the invention is described here with reference to a situation where there is a less interfered time period during each frame, it is also possible to define a time interval that is equal to a plurality of frames, with the less interfered time period then occurring at the same time position in each time interval.

Further, although the invention is illustrated with reference to an example in which each frame is divided into three sections, and the less interfered time period is equal to one third of one frame, it is also possible to divide each frame or other time interval into a different number of sections, such that the less interfered time period is equal to some different fraction of one frame or time interval.

When a first, less interfered, time period has been defined in each cell, one or more second time periods are also defined, in which there is a specific risk of interference from one or more respective other cell.

Thus, in this case, exterior user equipments in each cell, which would tend to have a greater risk of interference with other cells because they are closer to the cell boundaries, are preferably allocated resources during the less interfered time periods. Specifically, in this example, exterior user equipments in the cell 100 are preferably allocated resources during the time period $t_A$, exterior user equipments in the cell 120 are preferably allocated resources during the time period $t_B$, and exterior user equipments in the cell 140 are preferably allocated resources during the time period $t_C$.

However, if no such resources are available, an exterior user equipment may instead be allocated resources outside the less interfered time period of that cell, provided that it avoids the use of a second time period during which there is a particular risk of interference with a specific neighbouring cell.

Thus, considering cell 100, the time period $t_B$ may be regarded as such a second time period concerning interference from the cell 120, since exterior user equipments in that cell will preferentially be transmitting during that time period, while the time period $t_C$ may be regarded as such a second time period concerning interference from the cell 140, since exterior user equipments in that cell will preferentially be transmitting during that time period.

Therefore, for an exterior user equipment in the cell 100 that is in the region 102 bordering the cell 120, if that user equipment cannot be allocated resources in the less interfered time period $t_A$, it can instead be allocated resources during the time period $t_C$, in preference to the time period $t_B$. Similarly, for an exterior user equipment in the cell 100 that is in the region 104 bordering the cell 140, if that user equipment cannot be allocated resources in the less interfered time period $t_A$, it can instead be allocated resources during the time period $t_B$, in preference to the time period $t_C$.

As described above, it is exterior user equipments in a cell that are preferentially allocated resources in the less interfered time period defined for that cell. However, alternatively or additionally, other user equipments that require low interference conditions may be preferentially allocated resources in the less interfered time period.

The operation of the method is further illustrated with reference to its application in an unsynchronized network, in FIG. 6.

In FIG. 6, there are again shown the timings of transmissions from the three cells 100, 120, 140 described above. As mentioned previously, the transmissions from the three cells are divided into frames, as specified by the relevant OFDMA communication system. The available communication resources are then the available sub-channels into which the bandwidth is divided, and the available fractions of each frame. In one embodiment of the invention, each active user equipment may be allocated all of the available sub-channels for some fraction of each frame. In other embodiments, an active user equipment may be allocated only a fraction of the available sub-channels for some fraction of each frame.

Again, in this embodiment of the invention, each frame is divided into three sections, each of equal length, although the frames may be divided in any convenient way. Thus, a first frame transmitted from the cell 100 is divided into sections $t_{A5}$-$t_{A6}$, $t_{A6}$-$t_{A7}$, $t_{A7}$-$t_{A8}$, while a second frame is divided into sections $t_{A8}$-$t_{A9}$, etc. Similarly, a first frame transmitted from the cell 120 is divided into sections $t_{B5}$-$t_{B6}$, $t_{B6}$-$t_{B7}$, $t_{B7}$-$t_{B8}$, while a second frame is divided into sections $t_{B8}$-$t_{B9}$, etc, and a first frame transmitted from the cell 140 is divided into sections $t_{C5}$-$t_{C6}$, $t_{C6}$-$t_{C7}$, $t_{C7}$-$t_{C8}$, while a second frame is divided into sections $t_{C8}$-$t_{C9}$, etc.

Within each of the cells 100, 120, 140, a time period is defined, during which there is a lower probability of interference from neighbouring cells. In some situations, these time periods may be determined by the cell itself to be the first section of each frame. In other situations, the time period in one cell may be adjusted, based on reported timing measurements relating to other cells, such that the time periods become the same in all cells. This will tend to reduce the number of timing reports that are needed in the network.

Figure 6:
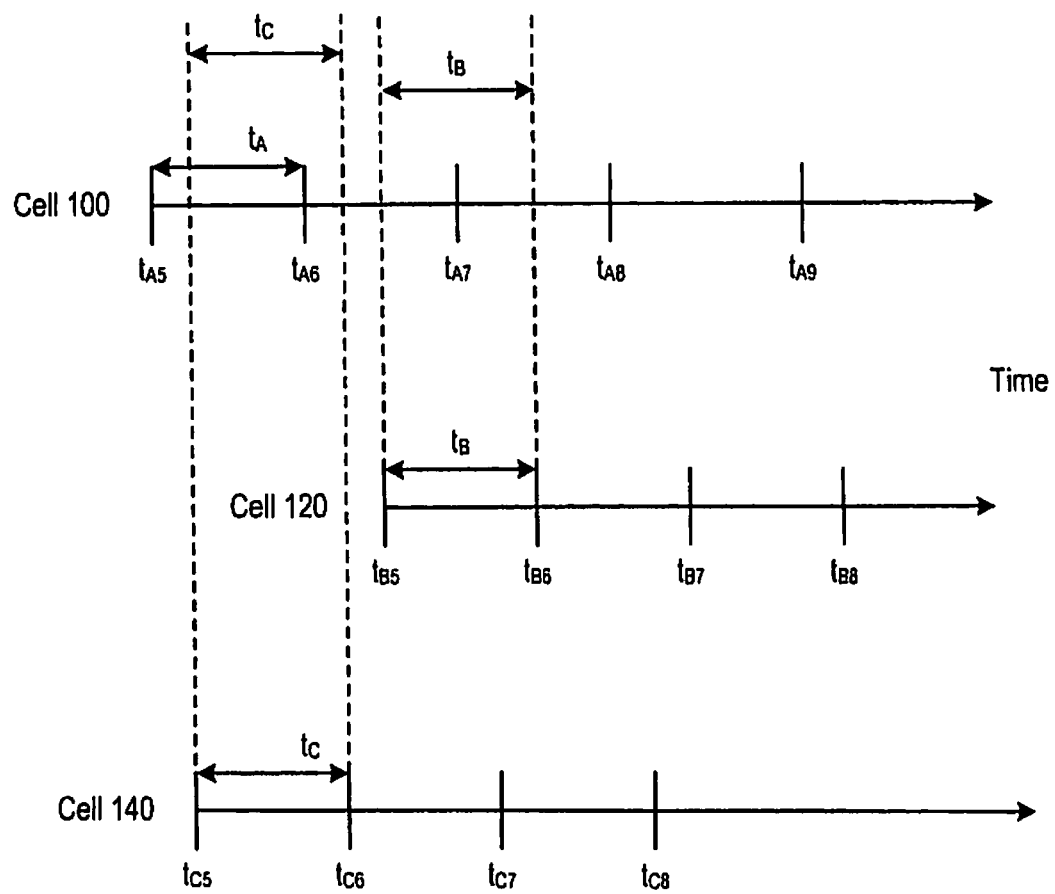
FIG. 6 is a timing diagram, illustrating operation of a second network in accordance with the method of FIG. 4.

In an unsynchronized system, the relative timings of the frames in the different cells are arbitrary, as shown in FIG. 6 and, furthermore, these relative timings may change. In any event, the time period is defined on a static or semi-static basis. That is, after the time period has been defined, it occurs at the same time position for a significant period of time, and in particular for the duration of a large number of frames, for example until measurements suggest that the radio environment has changed. However, the cell may set its own first time period based on the present conditions, and in particular based on the measurements of the timings in other cells. The cell can monitor the timing relations with the neighbouring cells on the basis of measurements made by the user equipments in the cell, or measurements made by the base station itself.

For example, as shown in FIG. 6, the cell 100 may adopt the time period $t_A$ from $t_{A5}$-$t_{A6}$ as its less interfered time period, the cell 120 may adopt the time period $t_B$ from $t_{B5}$-$t_{B6}$ as its less interfered time period, and the cell 140 may adopt the time period $t_C$ from $t_{C5}$-$t_{C6}$ as its less interfered time period.

As before, although the invention is described here with reference to a situation where there is a less interfered time period during each frame, it is also possible to define a time interval that is equal to a plurality of frames, with the less interfered time period then occurring at the same time position in each time interval.

Further, although the invention is illustrated with reference to an example in which each frame is divided into three sections, and the less interfered time period is equal to one third of one frame, it is also possible to divide each frame or other time interval into a different number of sections, such that the less interfered time period is equal to some different fraction of one frame or time interval.

When a first, less interfered, time period has been defined in each cell, one or more second time periods are also defined, in which there is a specific risk of interference from one or more respective other cell.

Thus, in this case, exterior user equipments in each cell, which would tend to have a greater risk of interference with other cells because they are closer to the cell boundaries, are preferably allocated resources during the less interfered time periods. Incidentally, although specific reference is made to the allocation of resources for exterior user equipments, which are likely to cause interference with user equipments in neighbouring cells as well as being more vulnerable to interference from user equipments in neighbouring cells, the methods described are applicable to any user equipments that require lower interference, such as interior user equipments having coverage problems or user equipments requiring particularly high data rates.

Specifically, in this example, exterior user equipments in the cell 100 are preferably allocated resources during the time period $t_A$, exterior user equipments in the cell 120 are preferably allocated resources during the time period $t_B$, and exterior user equipments in the cell 140 are preferably allocated resources during the time period $t_C$.

However, this is also subject to the condition that an exterior user equipment in a region bordering one or more particular neighbouring cell should preferably not be allocated resources during respective second time periods corresponding to the less interfered time periods of that one or more neighbouring cell.

Thus, considering cell 100, the time period $t_B$ may be regarded as such a second time period concerning interference from the cell 120, since exterior user equipments in that cell will preferentially be transmitting during that time period, while the time period $t_C$ may be regarded as such a second time period concerning interference from the cell 140, since exterior user equipments in that cell will preferentially be transmitting during that time period.

Therefore, for an exterior user equipment in the cell 100 that is in the region 102 bordering the cell 120, that user equipment can be allocated resources at any time during the less interfered time period $t_A$, because there is no overlap with the time period $t_B$. However, for an exterior user equipment in the cell 100 that is in the region 104 bordering the cell 140, that user equipment should preferentially be allocated resources in that part of the less interfered time period $t_A$ that does not overlap with the time period $t_C$.

There is thus disclosed a system for minimizing interference, based on the allocation of resources to user equipments, at times when there is a reduced possibility of such interference, as a result of some predetermined definition of a less interfered time period.

The invention claimed is:

1. A method of controlling a cellular wireless telecommunication system, in which data is transmitted in frames, and wherein, for a first cell of the system, there is at least semi-statically defined at a same time position in a plurality of consecutive time intervals a low interference time period for transmissions in the first cell, each of the time intervals comprising an equal number of frames, and the low interference time period being a time period during which neighbouring cells are configured to minimize interference in the first cell;

the method comprising, for at least one user equipment served by the first cell:

receiving signal strength measurements from the at least one user equipment; and based on the signal strength measurements, determining whether the at least one user equipment should be scheduled for the low interference time period, wherein the system is an unsynchronized system, and the method further comprises:

receiving neighbouring cell time difference measurements from the at least one user equipment within the first cell;

based on the neighbouring cell time difference measurements, determining a timing of transmissions from at least one neighbouring cell, relative to a timing of transmissions from the first cell, defining the low interference time period based on determined timing of transmissions from the at least one neighbouring cell;

determining based on the signal strength measurements whether the user equipment is an interior user equipment, located in an interior region of the first cell, or an exterior user equipment, located in an exterior region of the first cell; and making a determination as to whether the user equipment should be scheduled for the low interference time period based on whether the user equipment is an interior user equipment or an exterior user equipment.

2. A method as claimed in claim 1, wherein each time interval is equal to one frame.

3. A method as claimed in claim 1, further comprising, for the at east one user equipment served by the first cell:

determining whether the at least one user equipment is an exterior user equipment; and if so, preferentially scheduling the at least one user equipment in the low interference time period, while avoiding scheduling the at least one user equipment in the low interference time period of at least one other cell.

4. A method as claimed in claim 3, comprising:

determining at least one other cell that the at least one user equipment is close to; and avoiding scheduling the at least one user equipment in the low interference time period of the at least one other cell.

5. A network node, for use in a first cell of a cellular wireless telecommunication system in which data is transmitted in frames, the network node being configured:

for at least one user equipment served by the first cell, to receive signal strength measurements from the at least one user equipment, and to determine based on the signal strength measurements whether the at least one user equipment should be scheduled for a low interference time period, the low interference time period being at least semi-statically defined for transmissions in the first cell at a same time position in a plurality of consecutive time intervals, each of the time intervals comprising an equal number of frames, and the low interference time period being a time period during which neighbouring cells are configured to minimize interference in the first cell, wherein the system is an unsynchronized system, and the network node is further configured to:

receive neighbouring cell time difference measurements from the at least one user equipment within the first cell;

based on the neighbouring cell time difference measurements, determine a timing of transmissions from at least one neighbouring cell, relative to a timing of transmissions from the first cell;

define the low interference time period based on determined timing of transmissions from the at least one neighbouring cell;

for each of a plurality of user equipment served by the first cell, to determine whether each of the plurality of user equipment is an interior user equipment, located in an interior region of the first cell, or an exterior user equipment, located in an exterior region of the first cell; and to make a determination as to whether each of the plurality of user equipments should be scheduled for the low interference time period based on whether each of the plurality of user equipments is an interior user equipment or an exterior user equipment.

6. A network node as claimed in claim 5 being further configured, for each of a plurality of user equipment served by the first cell, to determine whether each of the plurality of user equipment is an exterior user equipment; and being further configured, if so, preferentially to schedule each of the plurality of user equipment in the low interference time period.

7. A network node as claimed in claim 6, being further configured, if each of the plurality of user equipment cannot be scheduled in the low interference time period, to:

determine at least one other cell that each of the plurality of user equipment is close to; and preferentially schedule each of the plurality of user equipment to avoid a low interference time period of the at least one other cell.

8. A network node as claimed in claim 5, being further configured, for the at least one user equipment served by the first cell:

to determine whether the at least one user equipment is an exterior user equipment; and if so, to schedule the at least one user equipment preferentially in the low interference time period, while avoiding scheduling the at least one user equipment in the low interference time period of at least one other cell.

9. A network node as claimed in claim 5, being further configured to:

determine at least one other cell that the at least one user equipment is close to; and avoid scheduling the at least one user equipment in the low interference time period of the at least one other cell.

* * * * *

UNITED STATES PATENT AND TRADEMARK OFFICE
CERTIFICATE OF CORRECTION

PATENT NO. : 8,681,745 B2
APPLICATION NO. : 12/739322
DATED : March 25, 2014
INVENTOR(S) : Müller Page 1 of 1

It is certified that error appears in the above-identified patent and that said Letters Patent is hereby corrected as shown below:

In the Specification:

Column 2, line 3, delete "time period" and insert therefor -- time period. --

In the Claims:

Column 9, line 13, Claim 1, delete "cell," and insert therefor -- cell; --

Column 9, line 30, in Claim 3, delete "at east" and insert therefor -- at least --

Signed and Sealed this
Twelfth Day of August, 2014

Michelle K. Lee
*Deputy Director of the United States Patent and Trademark Office*